United States Patent [19]
Izumi

[11] 3,926,739

[45] Dec. 16, 1975

[54] MULTIPLE-EFFECT MULTI-STAGE FLASH EVAPORATION PROCESS AND APPARATUS FOR DEMINERALIZING WATER

[75] Inventor: Kenkichi Izumi, Hitachi, Japan

[73] Assignee: Hitachi, Ltd., Tokyo, Japan

[22] Filed: Aug. 15, 1974

[21] Appl. No.: 497,624

[30] Foreign Application Priority Data
Aug. 15, 1973 Japan.............................. 48-90878

[52] U.S. Cl. ................ 202/173; 202/174; 203/11; 159/2 MS; 159/17 VS; 159/DIG. 8
[51] Int. Cl.²... B01D 1/28; B01D 1/26; B01D 3/02; B01D 3/00
[58] Field of Search ............. 202/173, 174; 203/11; 159/2 MS, 17 VS, DIG. 8, DIG. 22

[56] References Cited
UNITED STATES PATENTS

| | | | |
|---|---|---|---|
| 3,155,600 | 11/1964 | Williamson | 203/11 |
| 3,322,648 | 5/1967 | Kays et al. | 202/174 |
| 3,351,120 | 11/1967 | Goeldner | 159/13 B |
| 3,428,107 | 2/1969 | Backteman | 159/47 WL |
| 3,532,152 | 10/1970 | Cartinhour | 159/20 R |
| 3,672,960 | 6/1972 | Kays | 203/11 |
| 3,697,383 | 10/1972 | Weaver | 159/DIG. 8 |
| 3,830,704 | 8/1974 | Frank | 159/DIG. 8 |

FOREIGN PATENTS OR APPLICATIONS

| | | | |
|---|---|---|---|
| 1,196,140 | 7/1965 | Germany | 159/44 |
| 1,176,344 | 4/1959 | France | 159/DIG. 8 |

*Primary Examiner*—Jack Sofer
*Attorney, Agent, or Firm*—Thomas E. Beall, Jr.

[57] ABSTRACT

In a desalting plant of multiple evaporator effects and multistage flash evaporators, saline water including calcium sulfate is fed to a first flash evaporator after being preheated through the multiple flash evaporators to a temperature slightly below the critical precipitation temperature of hemihydrite, about 150° C, and in the first evaporator, the saline water is evaporated to produce brine and vapor. The brine from the first flash evaporator is introduced into a first evaporator effect to produce vapor and enriched brine. The enriched brine is then introduced into a subsequent flash evaporator where a portion of the enriched brine is further evaporated to produce vapor and further enriched brine. The vapor produced in the first evaporator effect condenses in a subsequent evaporator effect to transfer its latent heat of condensation and produce desalted condensate water.

In this manner, brine in an evaporator effect from a flash evaporator is evaporated to produce vapor and enriched brine, and the enriched brine is introduced into a subsequent flash evaporator, so that the brine containing super-saturated anhydrite calcium sulfate is condensed through every evaporator effect within a time insufficient to form scale of calcium sulfate on the surfaces of heat exchange tubes.

10 Claims, 3 Drawing Figures

MULTIPLE-EFFECT MULTI-STAGE FLASH EVAPORATION PROCESS AND APPARATUS FOR DEMINERALIZING WATER

BACKGROUND OF THE INVENTION

The present invention relates to a desalting process and apparatus, or saline water conversion, and more particularly relates to a desalting process and apparatus employing multiple evaporator effects and multistage flash evaporators, wherein the fed saline is preheated through the multistage flash evaporators.

In a desalting plant, one of the most difficult problems is to prevent scale formation on the surfaces of heat exchanger tubes used within the plant. Particularly, the solubility characteristics of calcium sulfate contained within saline water present difficult problems with respect to scale formation, because the characteristics are inverse with respect to the other constituents therein, that is, scale of calcium sulfate is formed on surfaces of heat exchange tubes both through increased concentration of the saline water by evaporation and through heating.

This scale formation not only causes low heat transfer coefficients on the heat exchanger tubes, but also restricts the amount of saline water flowing through the tubes. Once the scale of calcium sulfate has been formed on the surfaces of the heat exchanger tubes, the tubes themselves must be exchanged, because removal of the scale from the surfaces is quite difficult.

In prior desalting plants employing multiple evaporator effects having multistage flash evaporators, some portion of the brine in a flash evaporator is introduced to an evaporator effect to produce vapor and enriched brine, and the enriched brine thus produced is caused to flow back and recycle again to the same flash evaporator, while keeping the temperature of the brine substantially constant throughout the recycling operation. Thus, with this type of plant, it is impossible to heat the fed saline water above the precipitation temperature of anhydrite calcium sulfate, about 115° C, without the formation of scale.

The patent to Sieder U.S. Pat. No. 3,476,654, issued Nov. 4, 1969, recognizes and deals with the problem of scale formation in both a plant having serially connected multistage flash evaporators and a plant having serially connected evaporator effects.

The patent to Kays U.S. Pat. No. 3,672,960, issued June 27, 1972, discloses a plant combining evaporator effects with flash evaporators.

SUMMARY OF THE INVENTION

It is an object of the present invention to provide a desalting process and apparatus, where there will be no scale formation on surfaces of the exchanger tubes, while at the same time having an improved operating ability to produce desalted water and an improved thermal efficiency.

One feature of the present invention resides in the fact that the multistage evaporator comprises a plurality of evaporator units, with each unit having one evaporator effect and a plurality of flash evaporators. Each unit is connected in liquid flow series and so operated that a portion of the brine in one flash evaporator is evaporated under reduced pressure to produce vapor and enriched brine, a portion of the enriched brine is introduced to a corresponding evaporator effect and evaporated in evaporator tubes by a high temperature vapor from an evaporator effect of a previous evaporator unit for producing vapor and further enriched brine. The further enriched brine is introduced to a subsequent flash evaporator, wherein it is evaporated under further reduced pressure with the brine remaining from the previous flash evaporator.

Another feature of the present invention resides in that the saline water containing calcium sulfate introduced to the first flash evaporator of a first evaporator unit is preheated to a temperature slightly below the critical precipitation temperature of hemihydrite and condensed through the evaporator units within a time insufficient to form scale of calcium sulfate on the surfaces of the heat exchange tubes by maintaining the brine in a super-saturated condition with respect to the anhydrite calcium sulfate.

While the saline water and brine are below the hemihydrite calcium sulfate solubility limit and above the anhydrite calcium sulfate solubility limit, the evaporating and condensing operations are performed in "once-through flow", so that the anhydrite calcium sulfate is maintained in a super-saturated condition without scale formation. After the brine is cooled to a temperature below the anhydrite solubility limit, then the evaporating and concentrating operations are done in "recycling flow" so that a higher thermal efficiency is obtained without anhydrite scale formation on surfaces of the heat exchange tubes.

BRIEF DESCRIPTION OF THE DRAWINGS

Further objects, features and advantages of the present invention will become more clear from the following detailed description of a preferred embodiment, with variations, as shown in the accompanying drawing, wherein.

DESCRIPTION OF PREFERRED EMBODIMENTS

Figure 1:
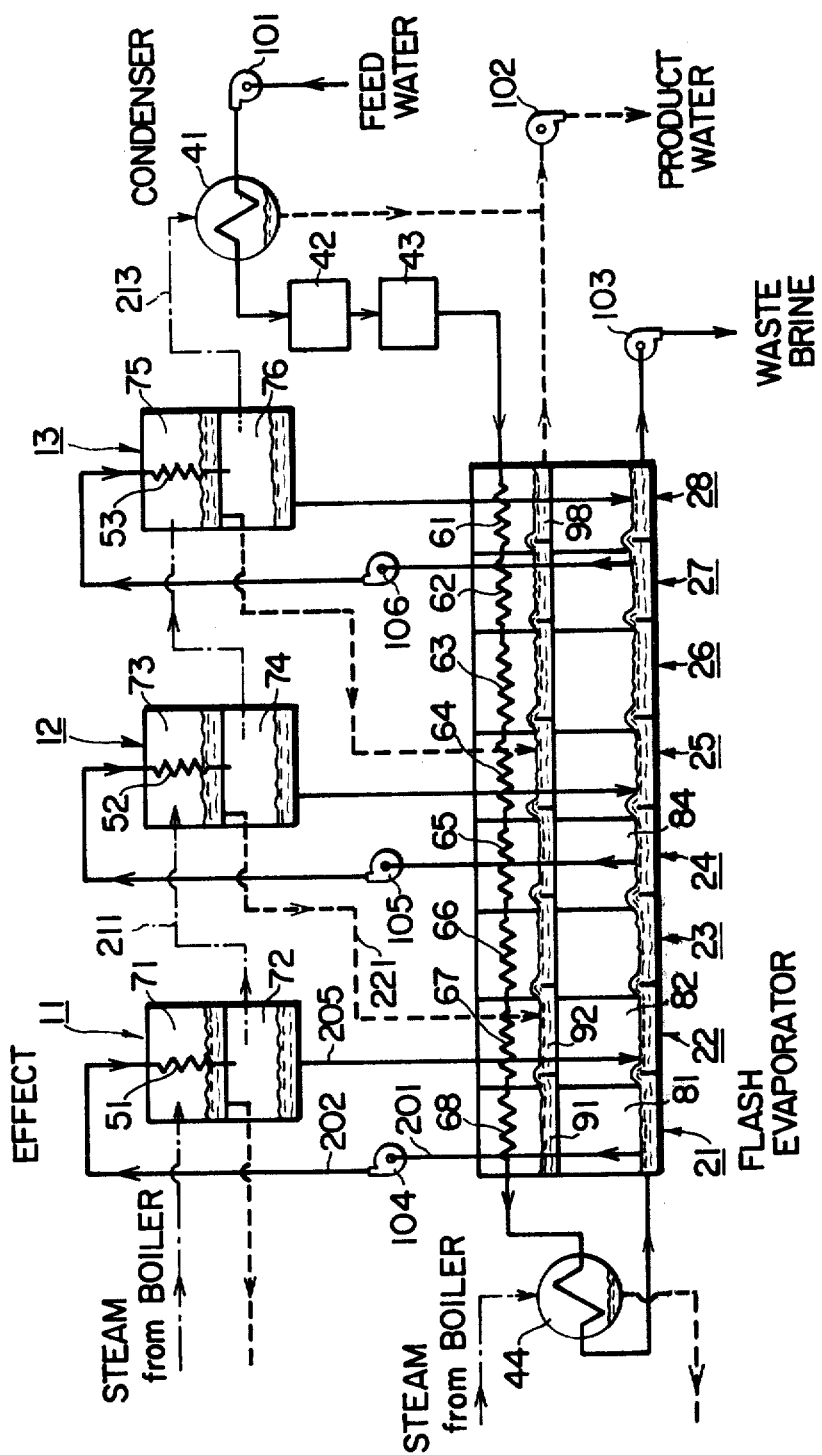
FIG. 1 is a schematic flow diagram of a desalting plant in accordance with a preferred embodiment of the present invention.

With the reference of the embodiment shown in FIG. 1, there is illustrated a desalting plant employing three (3) evaporator effects 11, 12 and 13 having associated therewith eight-stage evaporators 21–28.

In this flow diagram, the solid lines show saline or sea water streams and brine streams, the dotted lines shown desalted or condensate water streams, and the dot, dash lines show vapor streams.

Fed saline water from the ocean is pumped up by a feed water pump 101 to a final reject condenser 41, where the fed saline water is heated by vapor produced in a final evaporator effect 13 that is introduced into the condenser 41 through the pipe 213, and as a result, the vapor from pipe 213 condenses to produce desalted water and the saline water from pump 101 is preheated.

The fed saline water preheated within the final reject condenser 41 is decarbonated and deaerated by being passed through a decarbonator 42 and a deaerated 43. The decarbonated and deaerated saline fed water is then introduced into a condenser tube bundle 61 of a final stage flash evaporator 28. The saline fed water from the condenser tube bundle 61 flows inturn serially through the condenser tube bundles 62, 63, — and finally through the condenser tube bundles 68 of the respective stages of the flash evaporators 27, 26, — and 21. The thus preheated fed saline water after passing through the condenser tube bundle 68 of the first stage flash evaporator 21 is then introduced into a brine heater 41, and heated indirectly by condensing steam from a boiler (not shown), so that the fed saline water is heated to a predetermined maximum brine temperature of about 150° C, which is slightly below the temperature at which hemihydrite ($CaSO_4 \cdot \frac{1}{2}H_2O$) in the fed saline water begins to precipitate. The condensate in the saline water heater 44 is returned to the boiler.

The fed saline water after leaving the heater 44 flows into a flash chamber 81 of the first stage flash evaporator 21, where the fed water will partially flash into a vapor under a reduced pressure, and where the resulting concentrate brine will be cooled to the saturation temperature at the pressure of the stage 21. The vapor produced from the saline water flashing in the chamber 81 condenses on the surfaces of the condenser tube bundle 68 while transferring its latent heat to the saline water within the tube bundle 68, and the condensate falls into the product water tray 91.

Thereafter, the brine and condensate from flash evaporator 21 flow separately into the second stage flash evaporator 22, with the brine from the bottom of chamber 81 flowing into the bottom of chamber 82 and the condensate from product water tray 91 flowing into product water tray 92, where both liquid streams are caused to flash in the reduced pressure of the second flash evaporated stage 22 and further caused to cool to the saturation temperature of the reduced pressure within the stage 22. The vapor produced by both liquid streams in the stage 22 condenses on the outer surfaces of the condenser tube bundle 67 while transferring its latent heat to the fed saline water within the tube bundle 67, and the condensate falls into the product water tray 92 of the second stage flash evaporator 22. This process is similarly repeated through the flash evaporator stages 23–28. The fed saline water passing through the condenser tube bundles 61–68, as explained above, is preheated through indirect heat exchange with the vapor produced in the respective flash evaporator stages 28, 27, — and 21.

At the final stage 28, the condensate within the product water tray 98 of the flash evaporator 28 is collected along with the condensate from the final reject condensor 41 and delivered as product water by pump 102. The brine remaining within the final stage flash evaporator 28 is disposed of, preferably by being pumped into the ocean through a blow down pump 103.

A portion of the brine in the flash chamber 81 of the first stage flash evaporator 21 is pumped upwardly by a brine pump 104 through pipes 201, 202 to the first evaporator effect 111, where the brine enters into the top of a bundle of vertical heat exchange tubes 51. Heated steam is supplied from the boiler (not shown) to a stream chamber 71 of the first evaporator effect 11, where the steam transfers latent heat thereof to the brine in the tubes 51, which will cause condensation to form on the outer surfaces of the tubes 41, which condensate will be returned to the boiler. The brine within the tubes 41 will be partially evaporated to generate vapor in an amount that is equivalent to that supplied from the boiler. The vapor that is generated within the bundle of vertical heat exchange tubes 51 flows downwardly with the thus concentrated brine to a separating chamber 72.

The temperature of the brine within the evaporator effect 11 is maintained the same as the temperature of the brine within the first stage flash evaporator 21, from which the brine within the evaporator effect 11 has been obtained. The concentrated brine within the separating chamber 72 flows downwardly through a pipe 205 into the flash chamber 82 of the next stage flash evaporator 22. The brine within the flash chamber 82, which comes from the separating chamber 72 and from the flash chamber 81 is combined and flash evaporated in the flash chamber 82 of the second stage flash evaporator 22, and the pressure and temperature within the flash chamber 82 of the second stage flash evaporator 22 is kept lower than in the flash chamber 81 of the first stage flash evaporator 21. The brine in the flash chamber 82 is cooled during evaporation to the saturation temperature corresponding to the pressure within the flash chamber 82. The vapor obtained by thus evaporating the brine within the flash chamber 82 condenses on the outer surfaces of the bundle of condenser tubes 67 and the condensate falls into the product water tray 92.

The vapor that is separated from the brine within the separating chamber 72 of the evaporator effect 11 will pass through the pipe 211 and enter into the steam chamber 73 of a subsequent evaporator effect 12, wherein it will condense on the outer surfaces of a bundle of vertical heat exchange tubes 52 so that the resulting condensate will collect and be fed as a condensate stream through a pipe 221 into the product water tray 92 of the second flash evaporator 22.

A portion of the brine enriched in the flash chamber 84 of the fourth stage flash evaporator 24 is pumped upwardly by a brine pump 105 to the second evaporator effect 12, and further enriched by being evaporated in the heat exchange bundle 52 and separated within the separating chamber 74. The thus further enriched brine from the separating chamber 74 of the evaporator effect 12 is then introduced to the flash chamber of a subsequent stage, particularly the fifth stage, flash evaporator 25.

The vapor that was produced within the heat exchange bundle 52 of the evaporator effect 12 is separated within the separating chamber 74 is fed to the next evaporator effect 13, where it condenses to transfer it latent heat to the brine flowing within the tubes 53, and the thus formed condensate is fed to the product water tray of the flash evaporator 25. The vapor formed within the heat exchange tube bundle 53 is separated within the separating chamber 76 and passes through the vapor pipe 213 to the final reject condenser 41, where this vapor, as previously described, is condenses on the outer surfaces of the heat exchange tubes carrying therein the feed water from pump 104, to produce condensate that will be removed as product water by the pump 102.

It is seen that all of the heat supplied to the first evaporator effect 11, by condensing the steam from the boiler is passed as latent heat to the final condenser 41, where it is recovered to preheat the feed water. Each of the evaporator effects has the same function and there is no gain or loss of heat between the evaporator effect and the corresponding stage flash evaporator.

Figure 2:
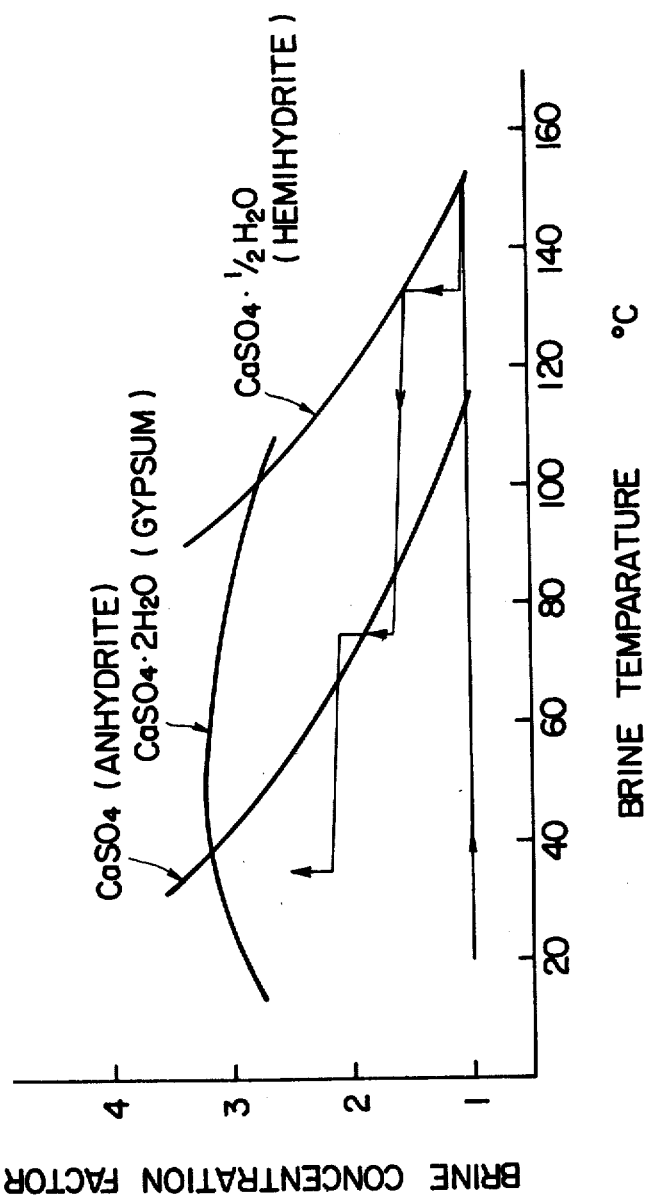
FIG. 2 is a graph representing a relationship between brine concentration factor and brine temperature for explaining the desalting plant of the present invention.

The graph of FIG. 2 presents the solubiltiy characteristic curves of three forms of calcium sulfate in saline water and brine, with the abscissa representing the brine concentration factor and the ordinate representing the brine temperature. Precipitation of calcium sulfate, for example, anhydrite ($CaSO_4$), hemihydrite ($CaSO_4$ ½$H_2O$), hydrated or gypsum ($CaSO_4$ $2H_2O$) in the brine never occurs under the conditions below the corresponding curves shown. The solid line with arrows shows the changes in concentration and temperature of the fed saline water along the brine flow of the present desalting plant as described in FIG. 1.

Fed saline water at a concentration factor of 1.0 and a temperature of 20° C is preheated to about 150° C by being passed through the final reject condenser 41, the flash evaporator stages 28–21, and the heater 44 as shown in FIG. 2 by the lower solid line with an arrow indicating the direction of flow. The thus preheated saline water is cooled to about 130° C and slightly concentrated in the first stage flash evaporator 21 as shown in FIG. 2. Thereafter, the brine is further enriched in the first evaporator effect 11 to a concentration factor of 1.5, while maintaining its temperature, as shown by the right hand vertical flow line. Thereafter, the brine is cooled and further enriched through the second, third and fourth stage flash evaporators 22, 23 and 24 to reach a temperature of 75° C as shown in the flow diagram of FIG. 2. Thereafter, the enriched brine passing through the fourth stage flash evaporator 24 is further concentrated in the evaporator effect 12 to a concentration factor of 2.1 at the same temperature as shown by the middle vertical flow line. Thereafter, the brine is cooled to 35° and further concentrated in the fifth, sixth and seventh stage flash evaporators 25, 26 and 27, respectively as shown in FIG. 2 by the next flow line. Thereafter, the enriched brine through the seventh stage flash evaporator 27 is introduced into the evaporator effect 13, wherein it is further concentrated to a concentration factor of 2.5 at the same temperature, as shown by the left hand vertical flow line of FIG. 2.

Figure 3:
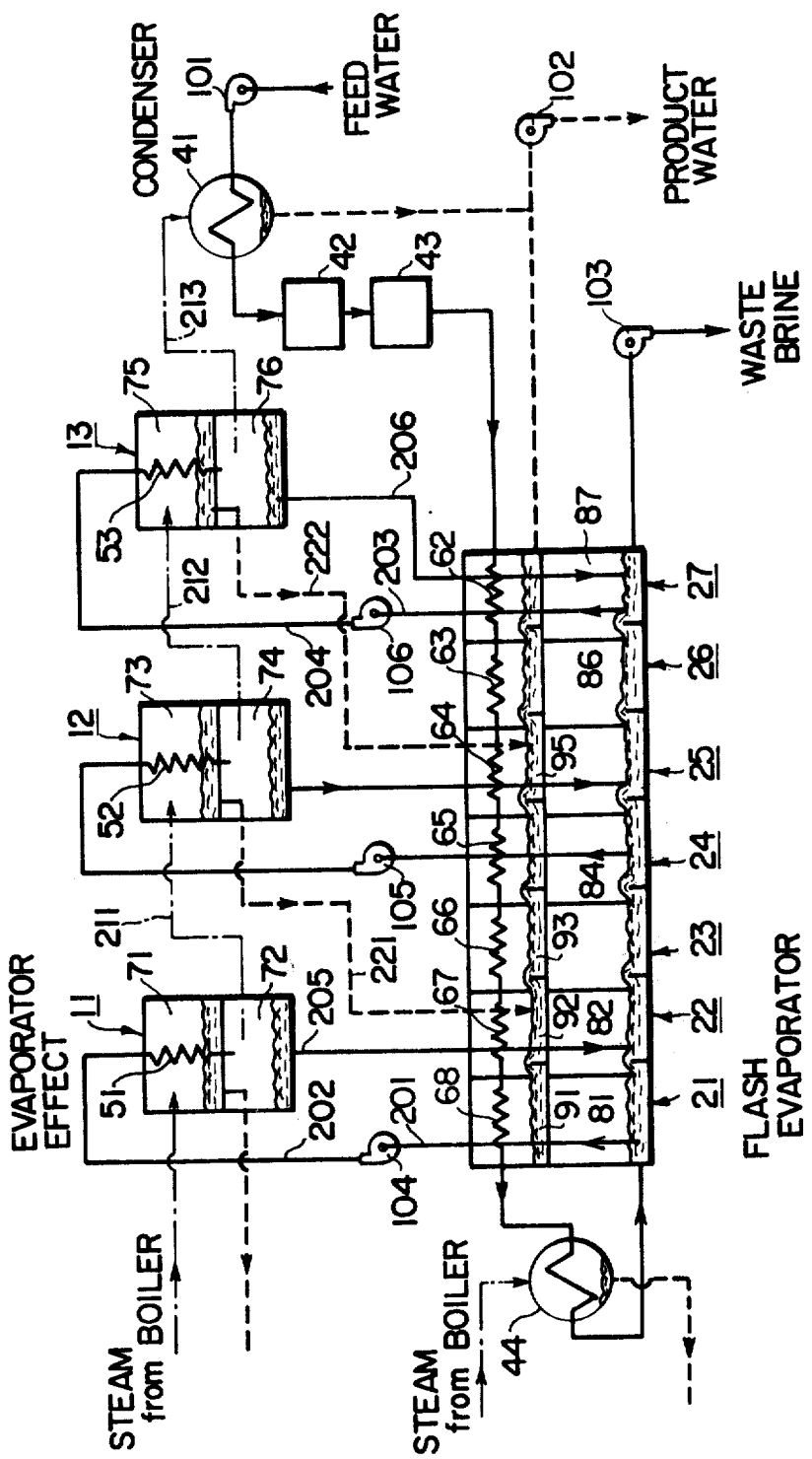
FIG. 3 is a schematic flow diagram of a desalting plant in accordance with another embodiment of the present invention.

FIG. 3 shows another embodiment of the present invention, which is quite similar to FIG. 1. Since most of the elements of FIG. 3 are identical to those shown and described with respect to FIG. 1, in structure, function and method of operation, corresponding numerals have been provided and generally the disclosure will not be repeated with respect to such identical elements.

The desalting plant as shown in FIG. 3 comprises three evaporator effects 11, 12 and 13, and seven stages of flash evaporators 21, 22, 23, 24, 25, 26, and 27.

In the plant of FIG. 3, the evaporator effects 11 and 12, and the flash evaporators 21, 22, 23, 24, 25 and 26 operate in the same manner as that shown and described with respect to FIG. 1.

After the brine in the flash chamber 86 of the sixth stage flash evaporator 26 passes into and flashes in the subsequent stage flash evaporator 27, a portion of the brine enriched in the flash chamber 87 of the seventh stage flash evaporator 27 is pumped by brine pump 106 upwardly through pipes 203 and 204 to enter into the top of a bundle of heat exchange tubes 53 of the evaporator effect 13. As previously explained, vapor supplied from the evaporator effect 12 through pipe 212 to the steam chamber 75 of the evaporator effect 13, which vapor will transfer its latent heat of concentration to the enriched brine within the tubes 53, which will cause condensate to form on the outside of the tubes 53 and be collected so as to be returned by pipe 222 to the product water tray 95 of the flash evaporator stage 25 and further cause vapor to be formed within the tubes 53. The condensing of the vapor from pipe 212 causes an evaporation of an equivalent amount of vapor within the tubes 53 and a further concentration of the brine within the tubes 53, which vapor and further concentrated brine are separated within the separating chamber 76 of the evaporator effect 13. The thus separated further concentrated brine from the separating chamber 76 is passed through pipe 206 to recycle or return to the same flash evaporator 27, from which the brine was pumped to the evaporator effect 13.

Thus, it is seen that the desalting plant shown in FIG. 3 is a combination of the so called once-through brine flow type and a conventional recycling brine flow type.

The following discussion is generally directed to both embodiments, unless specifically indicated otherwise.

In a multiple effect evaporator, the vapor condensation and the brine evaporation are effected by means of heat exchange tubes, thus resulting in an improved heat conduction. The rate of heat recovery and the thermal efficiency of the plant may be improved by the use of the multistage flash evaporators for preheating the sea water. In multistage flash evaporators, latent heat is turned into sensible heat, which again is converted into latent heat. In the multiple effect evaporator, the latent heat of the discharged vapor from a first evaporator is retained as latent heat in the vapor for the second evaporator, thus making it unnecessary to circulate the brine to retain the heat. The overall device may be small sized, and the pump motor power may also be lessened.

Because of the low brine density in the high-temperature evaporators, the maximum brine temperature may be increased, thus resulting in improved thermal efficiency. Since the brine is supplied to the evaporator effects by conduits leading from and to the flash evaporators, the supply quantity of brine may be changed as desired.

With reference to FIG. 2, it is seen that the brine may be heated to the critical precipitation temperature of calcium sufate, that is, the temperature at which the hemihydrite form will precipitate, without immediate fear of precipitation, because the anhydrite form will be super-saturated. It is seen that saline water having a concentration factor of 1, this is the highest temperature along the critical precipitation curve of hemihydrite. The first flash evaporator or plural evaporators, will reduce the temperature of the brine, without greatly increasing its concentration, so that the brine may pass through an evaporator effect at a single temperature while increasing its concentration, without going above the critical precipitation curve for hemihydrite.

However, according to the present invention, it has been found that the super-saturability of anhydrous calcium sulfate becomes less and precipitation occurs in a short time if the brine is circulated through a closed loop to and from the first evaporator effect, that is, if it is returned to the same flash evaporator from which it is withdrawn for the evaporator effect. Under such a closed loop or recycling situation, at least for the first one or more evaporator effects, the brine supplied from the multiple effect evaporator into the preheating flash evaporator pg,14 kept at a high temperature such that the precipitation of anhydrous calcium sulfate becomes inevitable. In order to prevent precipitation of anhydrous calcium sulfate, the brine temperature in conventional units employing recycling evaporator effects, must not be higher than 115° C, which is lower than the temperature usually observed in the multistage flash evaporator, or 120° C. According to the present invention, no precipitation of anhydrous calcium sulfate is present even though a sea water temperature equal to 150° C is used rather than the above mentioned conventional plant temperature of 115° C.

According to the present invention, when operating within the region above the precipitation curve for anhydrite calcium sulfate and below the critical precipitation curve of hemihydrite calcium sulfate, the brine that has been further concentrated in an evaporator effect is returned to a flash evaporator that is downstream, that is at a lower pressure and temperature, from the flash evaporator from which the brine was removed to be circulated to the same evaporator effect. In addition part of the brine contained in the flash evaporator stages is not supplied to the evaporator effects, but is introduced into the next subsequent flash evaporator, where the temperature and pressure are lower. Since the temperature of the further concentrated brine being returned from the evaporator effect is the same as it was when entering the evaporator effect as shown in FIG. 2, it is delivered into a subsequent flash evaporator of lower temperature and pressure, the temperature and pressure of the brine returning from the evaporator effect is lowered in a short time so that it is possible to keep the anhydrous calcium sulfate super-saturated. Thus, the present invention can circulate saline water and brine through flash evaporators and evaporator effects at temperatures above the precipitation curve of anhydite solubility up to the limit of the critical precipitation curve for hemihydrite calcium sulfate, without producing scale formation, because the anhydrous calcium sulfate will remain super-saturated.

It will be seen from the precipitation curves of anhydrous calcium sulfate and hemihydrite calcium sulfate plotted in FIG. 2, that the maximum temperature obtainable in the conventional plant for the condensation ratio equal to 1.0, that is for sea water, with recycled evaporator effect brine will amount to 115° C, while the temperature with the present invention may be 150° C. With a brine discharge temperature equal to 35° C, the range of temperature utilizable in the conventional plant under actual conditions is equal to 105° − 35°, or 70° C, whereas in the actual plant constructed according to the present invention, the difference is 145° − 35° or 110° C. Assuming the temperature differential between the neighboring evaporators to be 10° C, twelve evaporator stages can be used in a plant constructed according to the present invention in contrast to eight stages utilized in a conventional plant. Since the number of evaporator stages is about proporational to the increase in the water desalting efficiency expressed in percentage, the desalting efficiency can be improved in the present plant by about 50% over that of the conventional plant.

In addition, the advantages of combining a multiple effect evaporator with multistage flash preheating are optimum heat transfer, improved heat recover by use of the flash preheater, reduction in the speculation brine quantity, and improved thermal efficiency resulting from the elevated maximum brine temperature, all according to the present invention.

From the foregoing description, it will also be understood that, in the conventional plant, owing to the changes in the temperature of fed saline water, the quantity of the fed saline water must be controlled, as a result of the brine depth or level in the respective flash evaporator units. On the other hand, the desalting plant of the present invention may be constructed such that every flash evaporator is directly fluid connected in series and only a portion of the brine in a preceeding stage flash evaporator flashes in a subsequent flash evaporator. Thus even if the temperature of the feed saline water changes, the brine depth in respective flash evaporators is kept constant, which will promote production efficiency in the respective flash evaporators. Thus, constant product water efficiency is obtained even if the temperature of the feed saline water changes.

In the description of the preferred embodiments, three evaporator effects are employed both in FIGS. 1 and 3, but the number of evaporator effects is determined by performance ratio and cost of the plant, and is not to be limited to the number shown in the preferred embodiments. Also, the number of flash evaporator stages cooperating with one evaporator effect is determined by heat transfer coefficients and are not limited to the exact number shown.

It is noted that in the embodiment of FIG. 3, the evaporator effect 13 is of the recycling type, and not of the flow through type of the preceeding evaporator effects 11 and 12, that is, the evaporator effect 13 will discharge its concentrated brine from pipe 206 into the same flash evaporator chamber from which the brine is withdrawn by pipes 203 and 204 through the action of pump 106 to enter the evaporator effect 13, that is, the evaporator effect 13 employs a closed circulation loop for its brine. However, this will not result in precipitation of calcium sulfate, because the brine traveling in the closed loop is at all times below the precipitation curve for anhydrite calcium sulfate, as shown in FIG. 2 wherein the flow of brine is indicated by the left hand vertical flow portion, thus, the recycling type of evaporator effect does not have the disadvantage of precipitating calcium sulfate, while it does have the advantage of increased efficiency over the flow through types of evaporator effects 11 and 12.

While two preferred embodiments of the present invention, with variations, have been set forth for purposes of illustration and the advantages of their specific details, further embodiments, modifications and variations are contemplated according to the spirit and scope of the following claims.

I claim:

1. A desalting process for feed saline water containing scale forming materials including calcium sulfate, wherein saline water fed to multiple evaporator effects is preheated in multistage flash evaporators having flash chambers, and is evaporated and concentrated in the multiple evaporator effects to produce desalted water, which process comprises: flashing feed salt water in a first flash evaporator under a reduced pressure to product vapor and brine, while transferring the latent heat of the vapor to the feed saline water by indirect heat exchange therewith and simultaneously condensing the vapor to produce product desalted condensate, all at a temperature above which anhydrite calcium sulfate precipitates; evaporating a portion of the brine from the first flashing step in a first evaporator effect by the latent heat of condensation of other vapor to produce further vapor from said portion of the first brine to produce enriched brine, while condensing the other vapor to produce other condensate, all at a temperature above which anhydrite calcium sulfate precipitates; introducing the enriched brine produced in said evaporating step directly into the flashing chamber of a second flash evaporator without passing through the first flash evaporator; additionally flashing at least the enriched brine in the second flash evaporator separate from the first flash evaporator under a reduced pressure that is lower than the reduced pressure of the first flashing step to produce additional vapor and further enriched brine and by indirect heat exchange with the feed saline water condensing the thus produced additional vapor into product desalted condensate; and directing the further vapor produced in said evaporating effect step into a subsequent evaporator effect maintained at a pressure and temperature lower than the first evaporator effect and transferring the vapor produced in said first effect along with its latent heat of condensation into indirect heat exchange with brine from a flash evaporator other than the first flash evaporator.

2. The desalting process in accordance with claim 1, wherein the temperature of the feed salt water introduced into the first flashing step is kept below that at which hemihydrite calcium sulfate within the feed salt water precipitates.

3. The desalting process in accordance with claim 1, further including the step of introducing a portion of the brine from the first flash evaporator of said first flashing step directly into a subsequent flashing step at a lower pressure.

4. The desalting process in accordance with claim 1, further comprising the step of introducing a portion of the brine from the first flash evaporator of said first flashing step directly into the flashing chamber of the second flash evaporator of said additional flashing step.

5. The desalting process in accordance with claim 1, further comprising the step of returning the brine enriched in the subsequent evaporator effect to the same flash evaporator from which it was withdrawn, while maintaining the temperature of the said subsequent evaporator effect and the flash evaporator from which the brine was withdrawn for evaporating in the subsequent evaporator effect and into which the thus enriched brine was returned, both at a temperature lower than the temperature at which anhydrite calcium sulfate precipitates.

6. Desalting apparatus for saline water containing scale forming materials including calcium sulfate, comprising: a plurality of evaporator effects, each having a vapor condensing chamber having therein heat exchange means for conducting brine to be at least partially evaporated by the latent heat of condensation of vapor condensing on the exterior of the heat exchange means within the vapor chamber to transfer the latent heat of condensation to the brine to produce vapor from the brine within the heat exchange means through indirect heat exchange, and further including means for separating the thus formed vapor and enriched brine obtained within the heat exchange means; pipe means between said evaporator effects for directly transferring the separated vapor from one evaporator effect to the vapor chamber of a subsequent evaporator effect to be condensed in the subsequent evaporator effect; a plurality of flash evaporators, each being provided with a flashing chamber wherein salt water is flash evaporated at reduced pressure to produce vapor and brine, each of said flash evaporators further having preheater heat exchange means having its exterior in contact with the vapor within the flashing chamber to produce desalted condensate water on its exterior while preheating saline feed water passing through its interior with the vapor latent heat of condensation; first means for conducting only a portion of the brine from within the flashing chamber of one of said flash evaporators into the heat exchange means of the highest temperature one of said evaporator effects; second means for conducting the brine separated within said highest temperature evaporator effect directly into the flashing chamber of a second lower temperature one of said flash evaporators; means for maintaining said second flash evaporator at a lower pressure than the pressure within said one flash evaporator; and means for introducing a portion of the brine from the flashing chamber of said one flash evaporator directly into the flashing chamber of another flash evaporator; and means for maintaining said another flash evaporator at a lower pressure and temperature than said one flash evaporator.

7. The desalting apparatus of claim 6, further comprising means, which includes said first mentioned heat exchange means, for liquid serially connecting, in order of descending pressure and temperature, the flashing chambers of said flash evaporators for directly transferring the brine within a flashing chamber at one pressure into the flashing chamber of the next subsequent flash evaporator maintained at a lower pressure.

8. The desalting apparatus of claim 7, further comprising brine conduit means for all of the evaporator effects operating at temperatures above the temperature at which anhydrite calcium sulfate will precipitate from their brine, for transferring brine from the flashing chamber of a flash evaporator through a corresponding evaporator effect and returning the thus enriched brine to the next subsequent flash evaporator maintained at a lower pressure.

9. The desalting apparatus of claim 8, further comprising conduit means for the evaporator effects that will operate at temperatures below the temperature at which anhydrite calcium sulfate precipitates from their brine, for conducting brine from a flashing chamber to a corresponding evaporator effect and returning the thus enriched brine to the same flash evaporator from which it was withdrawn at substantially the same temperature.

10. Desalting apparatus for saline water containing scale forming materials including calcium sulfate, comprising: a plurality of evaporator effects, each having a vapor condensing chamber having therein heat exchange means for conducting brine to be at least partially evaporated by the latent heat of condensation of vapor condensing on the exterior of the heat exchange means within the vapor chamber to transfer the latent heat of condensation to the brine to produce vapor from the brine within the heat exchange means through indirect heat exchange, and further including means for separating the thus formed vapor and enriched brine obtained within the heat exchange means; pipe means between said evaporator effects for directly transferring the separated vapor from one evaporator effect to be condensed in the subsequent evaporator effect; a plurality of flash evaporators, each being provided with a flashing chamber wherein salt water is flash evaporated at reduced pressure to produce vapor and brine, each of said flash evaporators further having preheater heat exchange means having its exterior in contact with the vapor within the flashing chamber to produce desalted condensate water on its exterior while preheating saline feed water passing through its interior with the vapor latent head of condensation; first means for conducting at least a portion of the brine from within the flashing chamber of one of said flash evaporators into the heat exchange means of the highest temperature one of said evaporator effects; second means for conducting the brine separated within said highest temperature evaporator effect directly into the flashing chamber of a second lower temperature one of said flash evaporators; means for maintaining said second flash evaporator at a lower pressure than the pressure within said one flash evaporator; conduit means for the evaporator effects that will operate at temperatures below the temperature at which anhydrite calcium sulfate precipitates from their brine, for conducting brine from a flashing chamber other than said one flash evaporator to a corresponding evaporator effect and returing the thus enriched brine to the same flash evaporator from which it was withdrawn at substantially the same temperature; and means for maintaining each flashing chamber supplying and receiving brine from a single evaporator effect at a lower pressure and temperature than said one flash evaporator.

* * * * *